United States Patent [19]

Wilson et al.

[11] Patent Number: 4,796,946
[45] Date of Patent: Jan. 10, 1989

[54] AUTOMOTIVE VEHICLE DOOR AND BAR REINFORCEMENT

[75] Inventors: Roland B. Wilson, Valparaiso, Ind.; Jack M. Shapiro, Homewood; Richard S. Cline, Crete, both of Ill.

[73] Assignee: Inland Steel Company, Chicago, Ill.

[21] Appl. No.: 92,956

[22] Filed: Sep. 4, 1987

[51] Int. Cl.$^4$ .......................... B60J 5/00; B21C 37/04; C22C 38/18
[52] U.S. Cl. .................... 296/146; 296/188; 428/595; 148/333
[58] Field of Search ............... 296/188, 146; 148/333-335, 909; 420/104-109, 112; 428/594, 595, 582; 52/720, 483; 49/502, 503

[56] References Cited

U.S. PATENT DOCUMENTS

| | | | |
|---|---|---|---|
| 2,508,032 | 5/1950 | Kennedy | 189/37 |
| 2,916,324 | 12/1959 | Graham | 296/28 |
| 3,224,154 | 12/1965 | Toti et al. | 52/520 |
| 3,332,197 | 7/1967 | Hinkle | 52/731 |
| 3,868,141 | 2/1975 | Johnson | 296/146 |
| 3,868,804 | 3/1975 | Tantlinger | 52/98 |
| 3,977,149 | 8/1976 | Haynes et al. | 52/731 |
| 4,002,000 | 1/1977 | Howard et al. | 52/729 |
| 4,090,734 | 5/1978 | Inami et al. | 296/146 |
| 4,378,395 | 3/1983 | Asoshina et al. | 428/158 |
| 4,397,914 | 8/1983 | Miura et al. | 428/43 |
| 4,411,466 | 10/1983 | Koike | 296/146 |
| 4,451,518 | 5/1984 | Miura et al. | 428/137 |
| 4,554,718 | 11/1985 | Ollinger et al. | 29/155 R |
| 4,580,380 | 4/1986 | Ballard | 52/309.9 |

FOREIGN PATENT DOCUMENTS

| | | | |
|---|---|---|---|
| 56-156717 | 12/1981 | Japan | 148/333 |
| 57-13145 | 1/1982 | Japan | 148/333 |

OTHER PUBLICATIONS

"Development of Lightweight Door Intrusion Beams Utilizing an Ultra High Strength Steel," T. E. Fine and S. Dinda, Feb. 24-28, 1975.

*Primary Examiner*—Deborah Yee
*Attorney, Agent, or Firm*—Marshall, O'Toole, Gerstein, Murray & Bicknell

[57] ABSTRACT

An improved strengthening or reinforcing member is provided, particularly an automotive vehicle door bar or beam. The bar comprises an air cooled, hot rolled section of high strength alloy steel having a minimum tensile strength of about 150,000 lb/in$^2$ and a total elongation of at least about 7.5%. In a preferred embodiment the steel comprises about 0.16 to 0.21% carbon, about 1.8 tro 2.1% manganese; about 1.2 to 1.4% chromium; about 0.7 to 0.9% silicon; and the balance essentially iron. A clip element may be mounted on the bar to retard or prevent spreading of the flange portions of the section during bending. By securing or fixing the clip element to the section, a substantial improvement in load carrying capability is obtained.

16 Claims, 2 Drawing Sheets

AUTOMOTIVE VEHICLE DOOR AND BAR REINFORCEMENT

This invention relates to a novel and improved strengthening or reinforcing member of high strength steel that is adapted particularly for strengthening or reinforcing a metal panel or plate. More specifically, the invention relates to a novel and improved bar or beam for reinforcing an automotive vehicle door.

In the automotive vehicle industry today, it is necessary to comply with certain minimum strength requirements for the side doors of the vehicles as established by government regulations. The purpose of such requirements is to minimize the safety hazard caused by intrusion into the passenger compartment in a side impact accident.

Various types of reinforcing door bars have been proposed to meet these requirements, e.g., tubular steel bars, sheet steel stampings, and roll formed high strength martensitic steel sections of various configurations. However, the previously proposed door bars do not always provide the desired degree of high strength without other disadvantages. For exmple, martensitic steel has limited ductility, thus placing some restrictions on the permissible cross sectional configurations obtainable by roll forming. Furthermore, it is often desirable to have thickness variations in different portions of the section for achieving maximum strength without adding excessive weight to the vehicle. Such thickness variations are not feasible in cold formed sections.

The present invention provides a novel solution to the problem by utilizing an air cooled, hot rolled shape of high strength alloy steel which provides the desired high tensile strength while retaining the required ductility in the final product which may have various cross sectional configurations. In one specific embodiment of the invention, the shape comprises an elongated steel section having a central web portion and outwardly extending flange portions with one or more transverse clip members interconnecting the flange portions to retard or prevent spreading of the flange portions when a bending force is imposed on the section.

The invention is described in detail below with reference to the accompanying drawings, in which.

Figure 1:
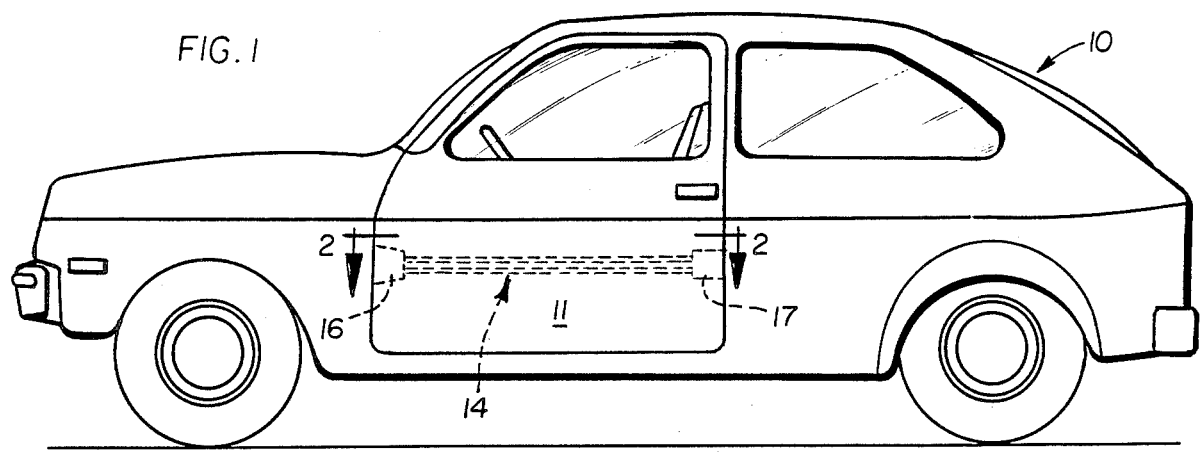
FIG. 1 is a side elevational view of an automotive vehicle showing a reinforcing member in the side door of the vehicle, in accordance with one embodiment of the inention.
Figure 2:
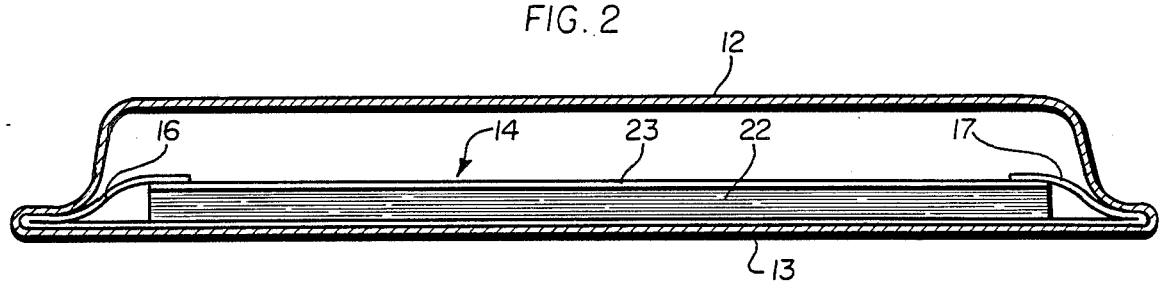
FIG. 2 is a schematic horizontal sectional view taken along the line 2—2 of FIG. 1.

Referring to FIGS. 1 and 2, an automotive vehicle 10 is shown which has a side door 11 formed from spaced inner and outer panel portions 12 and 13, respectively. An elongated reinforcing bar 14 is positioned transversely within the door and is secured adjacent the inside surface of the outer panel 13 by means of suitable end brackets, shown schematically at 16 and 17, which transmit the load to the hinge and latch portions of the door structure, respectively. As seen in FIG. 1, in this instance the door bar 14 extends substantially horizontally across the width of the door at approximately the waist height of an occupant seated in the vehicle. However, other orientations of the bar within the door may also be used.

In accordance with the present invention, the door bar 14 is cut to the required length, usually from about 20 to about 55 inches, from an air cooled, hot rolled section of high strength alloy steel. The section is hot rolled directly from a billet to the desired end shape. The use of hot rolling allows for substantial flexibility in the engineering design of the section, including thickness variations. iations.

Figure 4:
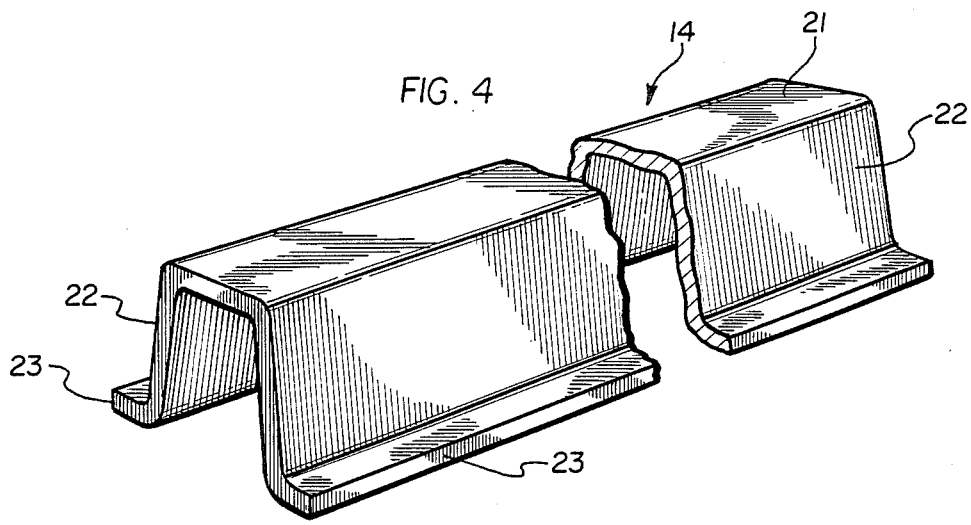
FIG. 4 is a perspective view of the reinforcing member.
Figure 5:
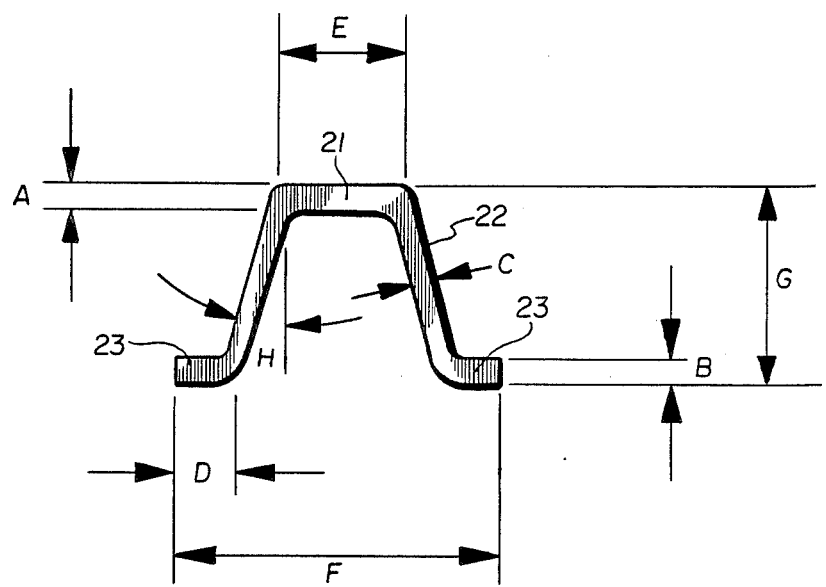
FIG. 5 is a transverse cross sectional view of the reinforcing member of FIG. 4 showing the dimensional relationships of an exemplary automotive door bar.

Although the invention is not limited to a specific cross sectional configuration, the preferred configuration can be described as generally C-shaped, H-shaped, I-shaped, or hat shaped. As seen in FIGS. 4 and 5, the preferred configuration has an elongated central web portion 21 and a pair of elongated flange portions 22 extending laerally outwardly from the plane of the web portion 21. Preferably, the flange portions 22 diverge outwardly at a slight angle from a plane perpendicular to the plane of the web portion 21. This angular relationship facilitates the hot rolling operation and also imparts stability to the bar when mounted in the door. The outer extremities of the flange portions 22 are provided with elongated integral foot portions 23 that project laterally outwardly substantially parallel to the plane of the web portion 21.

Figure 3:
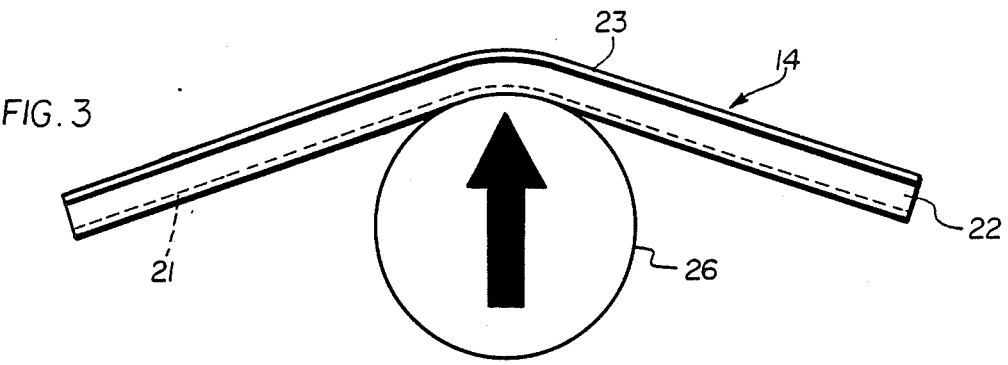
FIG. 3 is a schematic representation of the reinforcing member when subjected to a commonly used bending force test.

The prevailing government strength requirements for the side doors of motor vehicles are defined in the Motor Vehicle Safety Standard No. 214 which specifies a certain minimum crush resistance for the door when subjected to a specified test procedure. FIG. 3 is a schematic illustration of the test procedure in connection with the vehicle door illustrated in FIGS. 1 and 2. The door bar 14 is mounted within the door so that the web portion 21 of the door bar is adjacent the inside surface of outer panel 23 and thus receives the initial deflecting force of a simulated impact. In the test procedure, a loading device or ram consisting of a rigid cylinder 26 of specified dimensions is used to apply a load to the outer surface of the door panel 13 in an inward direction, as indicated by the large arrow, at a specified rate of travel. During the test the applied load and the displacement are recorded either continuously or in increments, and from these data the initial, intermediate, and peak crush resistances are determined. As seen in FIG. 3, the bending of the door bar 14 during the test places the web portion 21 in compression, the foot portions 23 in tension, and the flange portions 22 in shear.

In order to meet existing crush resistance requirements, we have determined that the high strength alloy steel used in the present invention must have a composition such that upon air cooling after hot rolling the steel section has a minimum tensile strength of about 150,000 $lb/in^2$ and a minimum total elongation of about 7.5%.

Preferably, the tensile strength will be from about 170,000 to 210,000 lb/in$^2$ and the total elongation will be about 10%. A suitable high strength steel having the foregoing properties contains (wt. % basis) about 0.14 to 0.21% carbon; about 3 to 4% of at least one hardenability element selected from the group consisting of manganese, chromium, molybdenum, boron, columbium, vanadium, and nickel; about 0.3 to 1.0% silicon; and the balance essentially iron. A preferred composition for purposes of the present invention comprises about 0.16 to 0.21% carbon, about 1.8 to 2.1% manganese; about 1.2 to 1.4% chromium; about 0.7 to 0.9% silicon; and the balance essentially iron. Dependent upon the steel composition selected, the microstructure of the final product may consist principally of bainite, retained austenite, or mixtures thereof, and possibly lesser amounts of martensite or ferrite.

As explained above, it is sometimes desirable to design the cross sectional configuration of the section so that different portions of the configuration have different thicknesses. In particular, in the configuration illustrated in FIGS. 4 and 5, it is desirable that the tension elements (feet 23) and the compression element (web 21) have a greater thickness than the shear elements (flanges 22). In FIG. 5, the significant dimensions of an exemplary cross sectional configuration are designated by the letters A through H. The thickness A of the web portion 21 and the thickness B of the foot portions 23 are about 0.160±0.008 inch and also greater than the thickness C of the flange portions 22. The thickness C of the flange portions 22 is about 0.110±0.012 inch. The width D of each of the foot portions 23 is about 0.41 inch, and the width E of the web portion 21 is about 0.82±0.02 inch so that the total width of both foot portions is about the same as the width of the web portion, thus providing a balanced relationship. The width F of the section, as measured between the outer edges of the foot portions 23, and the height G of the section will be selected to conform to the requirements of a particular door design. For many doors the width F will be about 2.08 inches or more, and the height G will be about 1.26±0.02 inch. The angle of divergence H of the flange portions 22 from a plane perpendicular to the web portion 21 is about 15°.

Figure 6:
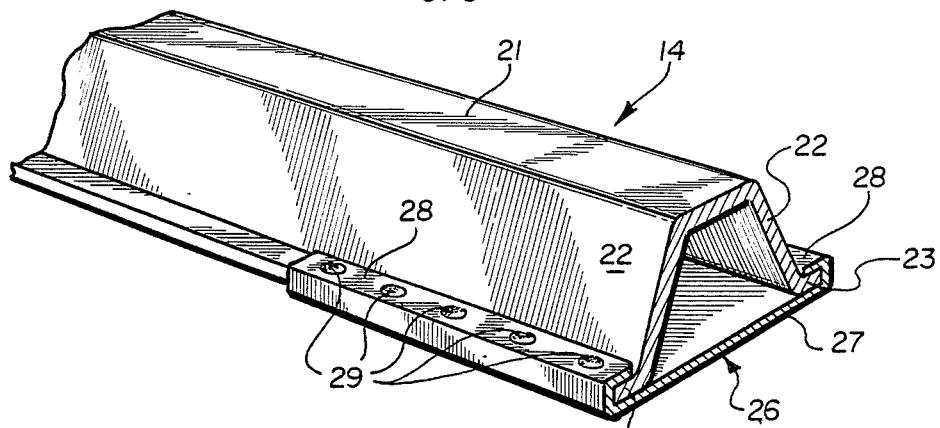
FIG. 6 is a perspective view showing another embodiment of the invention in which a clip member is utilized to retard or prevent spreading of the flange portions of the section.
Figure 7:
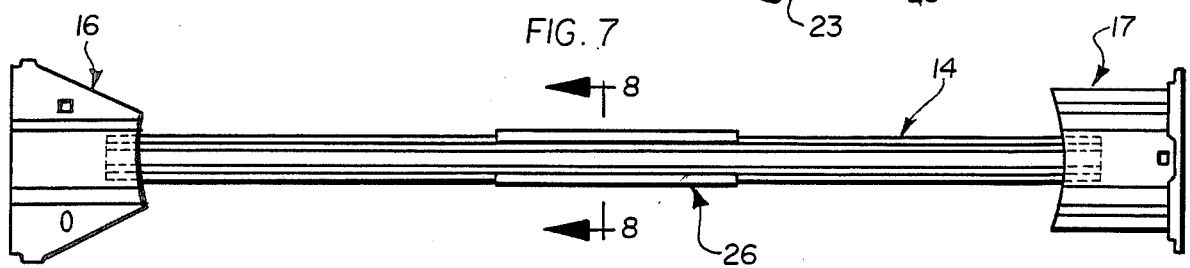
FIG. 7 is a fragmentary side elevational view showing the FIG. 6 embodiment of the reinforcing member with end attachments for mounting the member in a door.
Figure 8:
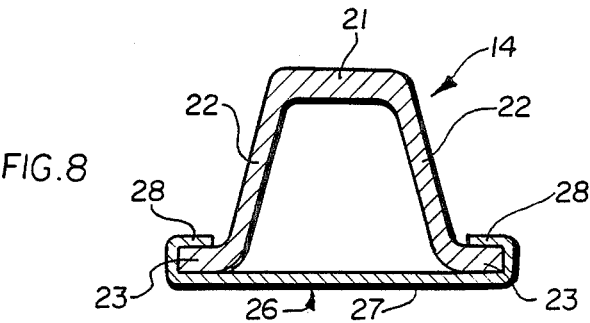
FIG. 8 is a transverse sectional view taken along the line 8—8 of FIG. 7.

In another specific embodiment of the invention illustrated in FIGS. 6 through 8, the reinforcing bar 14 is provided with a clip element 26 that extends between and interconnects the foot portions 23 of the flange portions 22 in order to retard or prevent spreading of the flange portions 22 when the bar is subjected to a bending force. In the illustrated embodiment, the clip element 26 has a flat planar portion 27 with the outer elongated edges turned upwardly and inwardly, as at 28, to enclose the foot portions of the bar.

If the clip element 26 is merely mounted on the bar 14 without being secured or fixed to the bar, the clip element will bend with the bar and will perform the desired function of retarding or preventing spreading of the flanges 22. For maximum performance, however, the upwardly and inwardly extending edge portions 28 of the clip element 26 are secured or fixed to the bar 14 so that the clip element stretches with the tensile side of the bar, i.e., the foot portions 23. In this manner, the load carrying capability of the bar is increased substantially, for example about 30%, especially in the early stages of deflection.

Any suitable means of securing or fixing the clip element to the bar may be used, including welding. As illustrated in FIG. 6, one effective method is mechanical crimping, as indicated by the spaced depressions 29 in the upper surface of the inturned clip portions 28. The crimping is accomplished by first providing countersunk depressions in the top surfaces of the foot portions 23 at spaced intervals, then forming the clip element 26 across the bottoms of the foot portions 23 and rolling the clip edges over the tops of the foot portions, and finally forcing the clip material into the countersunk depressions by means of a punch. The bottoms of the foot portions 23 may also be provided with countersunk depressions (not shown) that are offset from the top depressions, and the clip material is likewise forced by means of a punch into the countersunk bottom depressions.

If the clip element is secured to the bar by welding, the clip must be designed and the welds placed so as not to weaken the bar. This may be most easily accomplished by placing the weld near the neutral axis of the bar.

As seen in FIG. 7, a single clip element 26 of predetermined length will ordinarily be sufficient to provide the desired improvement in performance of the door bar. For example, a clip element having a length of about 18 inches will suffice for a bar about 34 inches long. However, a plurality of clip elements may be used if desired. In either case, the length of the clip element or elements is restricted and is less than the length of the bar 14 so that the weight added to the vehicle by the reinforcing structure is minimized consistent with the desired improvement in performance.

The material of the clip element may be a high strength cold rolled sheet steel that can be formed to the required configuration. The strength of the clip material is selected to provide the desired improvement in performance of the beam. For example, a typical clip material will be about 0.060 inch thick with a minimum yield strength of about 80,000 lb/in$^2$. The improved results obtained by means of the clip element can be used to reduce the total weight of the beam. For example, in FIG. 5, if the design beam width F and height G are maintained, the use of a clip element would permit a significant reduction in the thickness of the various portions of the section, thereby accomplishing a weight saving.

Although the invention has been described with reference to particular specific embodiments, it will be understood that various alternatives and modifications may be utilized without departing from the scope of the invention as defined in the claims.

We claim:
1. An elongated steel shape particularly adapted for use as a strengthening or reinforcing member for imparting crush resistance to a side impact against an automotive vehicle door, comprising
    a high strength alloy steel section having a predetermined shape, including an elongated web portion and elongated laterally extending flange portions;
    said steel section being hot rolled directly from a billet to said predetermined shape and thereafter air cooled;
    said high strength alloy steel containing about 0.14 to 0.21% carbon; about 3 to 4% of at least one hardenability element selected from the group consisting of manganese, chromium, molybdenum, boron, columbium, vanadium, and nickel; about 0.3 to 1.0% silicon; and the balance essentially iron; and said steel section having a minimum tensile strength of about 150,000 lb/in$^2$ and a total elongation of at least about 7.5%.

2. The shape of claim 1, wherein said steel contains about 0.16 to 0.21% carbon; about 1.8 to 2.1% manganese; about 1.2 to 1.4% chromium; about 0.7 to 0.9% silicon; and the balance essentially iron.

3. The shape of claim 1, wherein said steel has a tensile strength of from about 170,000 to about 210,000 lb/in$^2$ and a total elongation of about 10%.

4. The shape of claim 1, wherein said flange portions are provided with foot portions extending outwardly substantially parallel to the plane of said web portion.

5. The shape of claim 4, wherein the thicknesses of said web portion and said foot portions are greater than the thickness of said flange portions.

6. The shape of claim 1, wherein said flange portions diverge angularly outwardly from a plane perpendicular to said web portion.

7. The shape of claim 1, wherein at least one clip element extends between and interconnects said flange portions for retarding or preventing spreading of said flange portions when said section is subjected to a bending force.

8. The shape of claim 7, wherein said flange portions are provided with foot portions extending outwardly substantially parallel to the plane of said web portion, and said clip element engages the outer edges of said foot portions.

9. The shape of claim 8, wherein said flange portions diverge outwardly from a plane perpendicular to said web portion.

10. The shape of claim 7, wherein said clip element is secured or fixed to said section so as to stretch with said section during bending of said section.

11. The shape of claim 8, wherein said clip element is secured or fixed to said foot portions.

12. The shape of claim 11, wherein said clip element is secured or fixed to said foot portions by mechanical crimping.

13. The shape of claim 10, wherein said clip element is secured or fixed to said section by welding.

14. The shape of claim 7, wherein said clip element has a restricted length less than the length of said section.

15. In an automotive vehicle door having spaced inner and outer panels, the improvement comprising an elongated steel shape according to claim 1 disposed between said panels and extending adjacent the inside of said outer panel for reinforcing said door.

16. In an automotive vehicle door having spaced inner and outer panels, the improvement comprising an elongated steel shape according to claim 7 disposed between said panels and extending adjacent the inside of said outer panel for reinforcing said door.

* * * * *